US011115686B2

(12) United States Patent
Sagot et al.

(10) Patent No.: US 11,115,686 B2
(45) Date of Patent: Sep. 7, 2021

(54) METHOD OF RECORDING, IN A MASS MEMORY OF AN ELECTRONIC DEVICE, AT LEAST ONE MULTIMEDIA CONTENT

(71) Applicant: SAGEMCOM BROADBAND SAS, Rueil-Malmaison (FR)

(72) Inventors: Didier Sagot, Rueil Malmaison (FR); Jérôme Berger, Rueil Malmaison (FR)

(73) Assignee: Sagemcom Broadband SAS, Rueil Malmaison (FR)

(*) Notice: Subject to any disclaimer, the term of this patent is extended or adjusted under 35 U.S.C. 154(b) by 0 days.

(21) Appl. No.: 16/754,849

(22) PCT Filed: Oct. 19, 2018

(86) PCT No.: PCT/EP2018/078798
§ 371 (c)(1),
(2) Date: Apr. 9, 2020

(87) PCT Pub. No.: WO2019/091761
PCT Pub. Date: May 16, 2019

(65) Prior Publication Data
US 2021/0058648 A1 Feb. 25, 2021

(30) Foreign Application Priority Data

Nov. 9, 2017 (FR) .................................... 17 60549

(51) Int. Cl.
*H04N 21/231* (2011.01)
*H04L 29/06* (2006.01)
*H04N 21/24* (2011.01)
*H04N 21/435* (2011.01)

(52) U.S. Cl.
CPC ......... *H04N 21/231* (2013.01); *H04L 65/608* (2013.01); *H04N 21/2401* (2013.01); *H04N 21/435* (2013.01)

(58) Field of Classification Search
CPC ............. H04N 21/231; H04N 21/2401; H04N 21/435; H04L 65/608
See application file for complete search history.

(56) References Cited

U.S. PATENT DOCUMENTS

| 2009/0129274 | A1* | 5/2009 | Guillouard | H04L 41/0896 370/235 |
| 2009/0198907 | A1* | 8/2009 | Speight | G06F 12/0862 711/137 |
| 2010/0064337 | A1* | 3/2010 | Dvir | H04N 5/76 725/115 |
| 2011/0179455 | A1* | 7/2011 | Thompson | H04L 47/2416 725/82 |

(Continued)

*Primary Examiner* — Benjamin M Thieu
(74) *Attorney, Agent, or Firm* — Muncy, Geissler, Olds & Lowe, P.C.

(57) ABSTRACT

Method of recording a multimedia content broadcast streamwise, comprising the following steps: initialize a current throughput of recording of the stream in a mass memory; acquire a current portion of the multimedia content at the current recording throughput, and store it temporarily in the buffer memory; evaluate a rate of fill of the buffer memory; if the fill rate is greater than a predetermined high threshold of fill, decrease the current recording throughput; if the fill rate is less than or equal to a predetermined low threshold, increase the current recording throughput.

16 Claims, 2 Drawing Sheets

| Mbit/s | % access |
|---|---|
| 345 | 13.00% |
| 230 | 22.50% |
| 172 | 49.90% |
| 138 | 13.60% |
| 115 | 0.60% |
| 98 | 0.04% |
| 86 | 0.03% |
| 76 | 0.03% |
| 69 | 0.02% |
| 62 | 0.04% |
| 57 | 0.04% |
| 53 | 0.04% |
| 49 | 0.04% |
| 46 | 0.03% |
| 43 | 0.04% |
| 40 | 0.05% |

(56) References Cited

U.S. PATENT DOCUMENTS

2013/0159495 A1* 6/2013 Wang .................. H04N 19/164
709/224
2013/0227158 A1 8/2013 Miller et al.
2015/0350285 A1 12/2015 Mamidwar et al.

* cited by examiner

METHOD OF RECORDING, IN A MASS MEMORY OF AN ELECTRONIC DEVICE, AT LEAST ONE MULTIMEDIA CONTENT

The invention relates to the field of methods of recording at least one multimedia content in a mass memory of electronic equipment.

BACKGROUND OF THE INVENTION

Some equipment can be used for recording a multimedia content that is streamed, e.g. as an audio stream or an audio/video stream.

By way of example, such electronic equipment might comprise a set-top box.

Conventionally, the electronic equipment has a system memory and a mass memory. The system memory includes a buffer memory. By way of example, the mass memory may be a hard disk. The multimedia content is recorded temporarily in the buffer memory prior to being recorded in the hard disk.

In order to avoid losing data from the multimedia content as a result of a hard disk bottleneck or as a result of the buffer memory overflowing, it is appropriate to record the multimedia content without exceeding a guaranteed recording rate. The guaranteed recording rate is defined on the basis of a guaranteed response time of the hard disk to a write request. The guaranteed response time corresponds to a maximum response time of the hard disk, i.e. a time that the hard disk is deemed never to exceed.

However, given the way it is designed, a hard disk presents a response time that is variable, and it is therefore capable of recording a multimedia content at a data rate that is variable. This is due to the fact that maintenance operations are performed as a background task in the hard disk. Maintenance operations comprise in particular refreshing data already stored on the hard disk. Thus, it can happen occasionally that a hard disk has a longer response time to a write request.

The table of FIG. 1 and the graph of FIG. 2 show the results of a test to which a conventional hard disk has been subjected. The test set out to evaluate the performance of the hard disk in terms of recording rate. The duration of the test was equal to about one hundred hours.

In the table and on the graph, a recording rate 1 is associated with a percentage of accesses 2 to the hard disk. The term "access", is used to mean a request to write on the hard disk.

It can be seen that the recording rate 1 that the hard disk can achieve varies between a minimum effective recording rate equal to 40 megabits per second (Mb/s) and a maximum effective recording rate equal to 345 Mb/s.

It can also be seen that high recording rates 3 correspond to high percentages of accesses 4 to the hard disk, while low recording rates 5 correspond to low percentages of accesses 6 to the hard disk.

Throughout the duration of the test, 99% of accesses made it possible to guarantee a recording rate greater than 140 Mb/s. Nevertheless, when the remaining 1% of accesses are included, so as to take account of the worst-case situations, a guaranteed recording rate is obtained that is equal to 40 Mb/s.

Thus, the hard disk is used at the guaranteed recording rate so as to avoid losing any data. However, not only is the guaranteed recording rate well below the maximum effective recording rate, but it also corresponds to low performance that is suffered only very rarely by the hard disk.

Using the guaranteed recording rate thus amounts to not taking advantage of the full passband of the hard disk, and consequently to limiting the number of streams that can be recorded simultaneously and to limiting the mean quality of each stream.

This is particularly true in that streams themselves present rates that are variable, for which the worst-case situation is also the basis used for defining both the number of streams that can be recorded simultaneously and also the mean quality of each stream. Specifically, the worst-case situations correspond to the maximum rates of the streams.

OBJECT OF THE INVENTION

An object of the invention is to increase the number and the quality of the streams that can be recorded simultaneously in electronic equipment having a buffer memory and a mass memory.

SUMMARY OF THE INVENTION

In order to achieve this object, there is provided a recording method for recording, in a mass memory of electronic equipment, at least one multimedia content streamed as at least one stream such as an audio stream or an audio/video stream, the multimedia content being stored temporarily in a buffer memory of the electronic equipment prior to being recorded in the mass memory, the recording method comprising the steps of:
  initializing a current recording rate for the stream in the mass memory;
  acquiring a current portion of the multimedia content at the current recording rate, and storing it temporarily in the buffer memory;
  evaluating an occupancy fraction for the buffer memory;
  if the occupancy fraction of the buffer memory is greater than a predetermined high occupancy threshold, decreasing the current recording rate;
  if the occupancy fraction of the buffer memory is less than or equal to a predetermined low occupancy threshold, increasing the current recording rate.

The recording method of the invention makes it possible to ensure that the buffer memory does not overflow, and thus that all of the data of the multimedia content is indeed recorded in the mass memory. Thus, by initializing the current recording rate to a high available value, it is possible to optimize the use of the passband of the mass memory, while ensuring that no data of the multimedia content is lost. Optimizing the use of the passband of the mass memory makes it possible to increase the number and the quality of streams that can be recorded simultaneously in the electronic equipment.

There is also provided electronic equipment including a mass memory and a system memory including a buffer memory, the electronic equipment being arranged to perform the above-described recording method.

There is also provided a computer program including instructions to enable a microcontroller of a set-top box to perform the above-described recording method.

There are also provided storage means, characterized in that they store a computer program including instructions to enable a microcontroller of a set-top box to perform the above-described recording method.

Other characteristics and advantages of the invention appear on reading the following description of a particular, nonlimiting embodiment of the invention.

BRIEF DESCRIPTION OF DRAWINGS

Reference is made to the accompanying drawings, in which.

DETAILED DESCRIPTION OF THE INVENTION

In this example, the recording method of the invention is performed in a set-top box that is for connecting to a TV set. The set-top box includes processor means, a system memory, and a mass memory.

In this example, the processor means comprise a processor component that is a microcontroller, however it could be some other component, e.g. a processor, a field programmable gate array (FPGA), or an application specific integrated circuit (ASIC), etc. The processor component is adapted to execute instructions of a program for performing the recording method of the invention.

The system memory of the set-top box includes a buffer memory.

The mass memory of the set-top box includes a hard disk. It should be observed that the buffer memory is external to the mass memory, i.e., in this example, it is not included in the hard disk.

The set-top box is arranged, on request from a user, to record a multimedia content, or indeed to record a plurality of multimedia contents simultaneously. Each multimedia content comes from a streaming source, specifically in this example from an Internet server.

Each multimedia content is streamed as an audio/video stream that is received by the set-top box. The multimedia content is stored temporarily in the buffer memory prior to being recorded on the hard disk.

In this example, the audio/video stream is a live stream. The multimedia content is thus a multimedia content that is streamed live, e.g. a sports event or TV news.

In this example, the audio/video stream is streamed in compliance with the DASH ISO/IEC 23009-1 standard. DASH stands for "dynamic adaptive streaming over HTTP".

In that standard, the multimedia content is subdivided into a plurality of portions, which are segments of short duration.

Each segment is available on the server for acquisition by the set-top box at at least one segment rate, and specifically at a plurality of segment rates.

The segment rates associated with a given segment are different, and each of them is associated with a distinct size in bytes.

A high segment rate corresponds to high-quality playback of the segment by the TV set connected to the set-top box. All of the segment rates are listed in at least one manifest file. In this example there is a single manifest file for each multimedia content, however it is possible to have a plurality of manifest files, possibly grouped together in a "header" manifest file.

Figure 1:
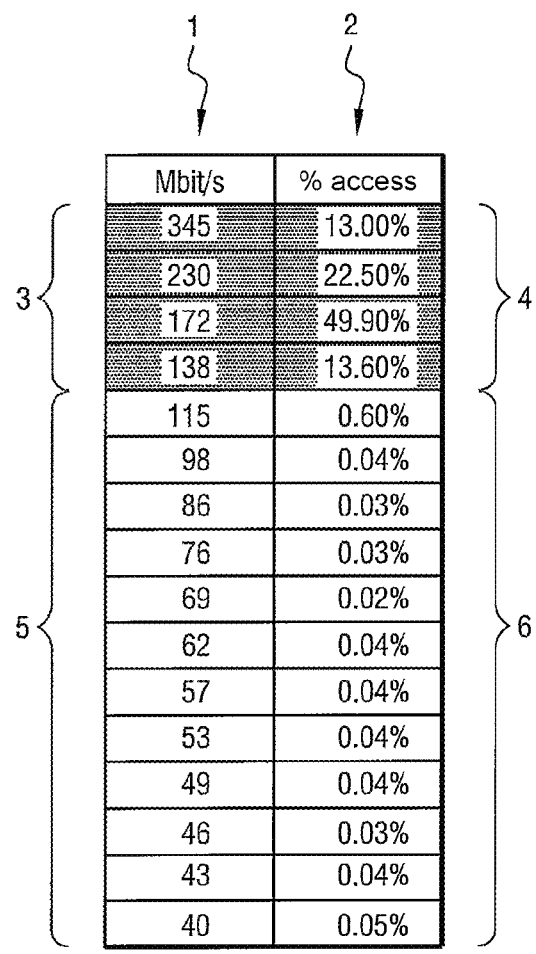
FIG. 1 shows a table of recording rate values, each associated with a percentage of accesses.
Figure 2:
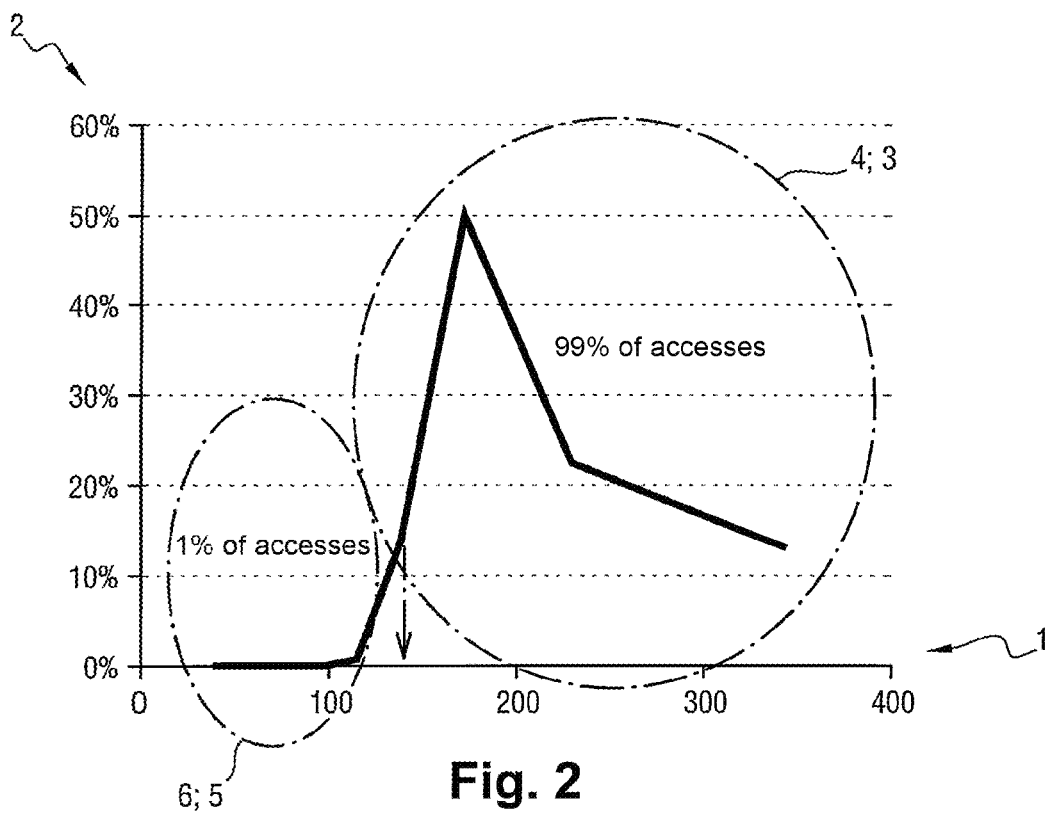
FIG. 2 shows a graph comprising a curve of values for percentage of accesses as a function of values for recording rate, said values corresponding to the values in the table of FIG. 1.
Figure 3:
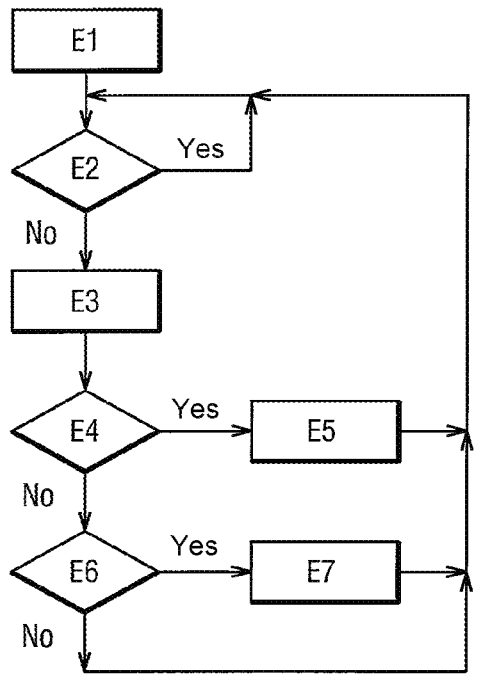
FIG. 3 shows steps of the recording method of the invention.

With reference to FIG. 3, there follows a description in greater detail of the recording method of the invention.

The recording method begins with a step of retrieving a manifest file associated with the audio/video stream and thus with the multimedia content that is to be received by the set-top box.

A first segment of the multimedia content is then identified. In the manifest file, the first segment is associated with a plurality of segment rates at which the first segment is available.

A current recording rate for the stream in the hard disk is then initialized with a high value for the rate (step E1). The high rate value corresponds to the maximum segment rate associated with the first segment in the manifest file. The current recording rate is thus given the maximum segment rate associated with the first segment.

The first segment and the following segments are thus received with high quality.

Thereafter, for each current segment (or current portion) of the multimedia content, comprising and then following the first segment, the recording method includes a step of determining whether the buffer memory is full (step E2).

If the buffer memory is full, the recording method is put on hold, until space becomes available in the buffer memory.

If the buffer memory is not full, the current segment is requested from the server at the current recording rate. The method then waits for the server to send the current segment. The current segment is acquired at the current recording rate, and is then stored temporarily in the buffer memory (step E3).

The recording method then includes a step of evaluating an occupancy fraction of the buffer memory.

Evaluating the occupancy fraction consists either in estimating the occupancy itself directly, or else in evaluating a parameter that is representative of the occupancy and in deducing the occupancy fraction therefrom. By way of example, the parameter may be a duration during which the effective recording rate in the hard disk is less than the current recording rate, or it may be a change in occupancy.

If the occupancy fraction of the buffer memory is greater than a predetermined high occupancy threshold (step E4), the current recording rate is decreased (step E5). Decreasing the current recording rate consists in defining a new current recording rate that is less than the preceding current recording rate, and in doing so as a function of a mean write rate for writing to the hard disk and/or of a mean receive rate at which the set-top box is receiving the multimedia content.

Using of the mean receive rate makes it possible to avoid problems arising if the Internet is not capable of delivering a rate that is sufficient for streaming the multimedia content in real time. Under such circumstances, no account is taken of the occupancy fraction of the buffer memory. The mean write rate and the mean receive rate are rates that are observed, i.e. effective rates as estimated or measured by the set-top box.

Thus, by way of example, if the current recording rate is equal to 6 Mb/s, the new current recording rate may be changed to 4 Mb/s.

In contrast, if the occupancy fraction of the buffer memory is less than or equal to a predetermined low occupancy threshold (step E6), then the current recording rate is increased (step E7). Increasing the current recording rate consists in defining a new current recording rate that is greater than the preceding current recording rate, and in doing so as a function of a mean write rate for writing to the hard disk and/or of a mean receive rate at which the set-top box is receiving the multimedia content.

Once again the mean write rate and the mean receive rate are once more rates that are observed, i.e. effective rates as estimated or measured by the set-top box.

Thus, by way of example, if the current recording rate is equal to 2 Mb/s, the new current recording rate may be changed to 4 Mb/s.

In this example, the predetermined high occupancy threshold is equal to 75%, while the predetermined low occupancy threshold is equal to 25%.

Steps E2 to E7 are then repeated for each new current segment of the multimedia content.

It should be observed that, when the buffer memory is empty, the method waits for the server to make the next current segment available via the current manifest file. It should also be observed that the buffer memory overflowing would have the consequence of losing data from the multimedia content. When such lost data is video data, that gives rise on playback to disturbances such as the presence of a macro-block, an image freeze, etc.

Naturally, the above also applies when a plurality of streams are recorded in parallel and in simultaneous manner on the hard disk.

Managing parallel recording of a plurality of streams may consist firstly in performing the above-described recording method for each stream, in independent manner. Each stream is then associated with a distinct buffer memory.

Alternatively, it is also possible to consider that the buffer memories associated with the various streams are grouped together in a single global buffer memory of large size, with the recording method of the invention being applied to that global memory. The current recording rate for each stream is decreased or increased in proportion to the rate of that stream, as a function of the occupancy of the global buffer memory.

Alternatively, it is also possible to define priorities among the streams and to associate each stream with a weighting coefficient that depends on the priority of the stream. The amount the current recording rate of each stream is decreased or increased then depends on its weighting coefficient, and thus on its priority. This serves to favor certain streams for which the current recording rate is decreased more slowly in the event of congestion of the hard disk (and thus of high occupancy of the buffer memory), and conversely for which the current recording rate is raised more quickly when the congestion of the hard disk disappears.

The recording method can thus be performed to record a first multimedia content streamed as a first stream and at least one second multimedia content streamed as a second stream. The recording method includes the step of defining a high priority stream and a low priority stream from among the first and second streams.

If the occupancy fraction of the buffer memory is greater than the predetermined high occupancy threshold, the recording method initially decreases the current recording rate of the low priority stream.

If that does not suffice, the current recording rate of the low priority stream is decreased down to a minimum segment rate defined by the associated manifest file. If that still does not suffice, the current recording rate of the high priority stream is decreased in the same manner.

If the occupancy fraction of the buffer memory is less than the predetermined low occupancy threshold, the recording method initially increases the current recording rate of the high priority stream.

If that does not suffice, the current recording rate of the high priority stream is increased up to a maximum segment rate defined by the associated manifest file. If that still does not suffice, the current recording rate of the low priority stream is increased in the same manner.

The priorities may be defined by the user, who may interact with a menu displayed by the set-top box on the screen of the TV set, for example.

The priorities may also be defined by the set-top box.

The set-top box can thus define the allocation of priorities in arbitrary manner.

The set-top box can also define the allocation of priorities in non-arbitrary manner, by performing a decision algorithm. For example, the set-top box may define the allocation of priorities in advance as a function of the user's habits. For example, if the user is in the habit of recording a particular TV series, the set-top box can itself decide to record the next episode of that TV series with low priority, since it is not the user who has requested the recording.

It should be observed at this point that the recording method of the invention is particularly advantageous for a live stream. Specifically, when the stream is not live, it is possible to record it at maximum quality, even if that means not recording it in real time and going back to recover non-recorded portions of the multimedia content.

Naturally, the invention is not limited to the embodiment described, but covers any variant coming within the ambit of the invention as defined by the claims.

The invention can naturally be implemented in electronic equipment other than a set-top box, e.g. in a digital radio receiver.

The stream is not necessarily streamed using a DASH standard. By way of example, the standard could be the smooth streaming standard or the multicast adaptive bit rate (ABR) standard.

The stream is not necessarily an audio/video stream, and it could be some other stream, e.g. an audio-only stream.

The mass memory is not necessarily a hard disk, and for example it could be a solid state drive (SSD) or an optical disk.

The mass memory could also be remote, i.e. situated in the network at a distance from the set-top box (or some other electronic equipment).

By way of example, the mass memory could then be incorporated in a network attached storage (NAS) server. By way of example, the network could be of the local area network (LAN) type or of the wireless local area network (WLAN) type.

The recording method of the invention is then performed in a system comprising the set-top box (or some other electronic equipment) and the mass memory.

The invention claimed is:

1. A recording method for recording, in a mass memory of electronic equipment, at least one multimedia content streamed by at least one stream, the multimedia content being stored temporarily in a buffer memory of the electronic equipment prior to being recorded in the mass memory, the recording method comprising the steps of:

initializing a current recording rate for the stream in the mass memory, the current recording rate being a current rate of access to the mass memory;

acquiring a current portion of the multimedia content at the current recording rate, and storing it temporarily in the buffer memory;

evaluating an occupancy fraction for the buffer memory, the occupancy fraction being a fraction of the buffer memory being occupied;

if the occupancy fraction of the buffer memory is greater than a predetermined high occupancy threshold, decreasing the current recording rate;

if the occupancy fraction of the buffer memory is less than or equal to a predetermined low occupancy threshold, increasing the current recording rate.

2. The recording method according to claim 1, wherein the stream is a live stream.

3. The recording method according to claim 1, wherein the multimedia content is subdivided into segments, the current portion of the multimedia content comprising one segment, each segment being available at at least one segment rate, the segment rates being listed in a manifest file.

4. The recording method according to claim 3, wherein initializing the current recording rate comprises the step of allocating to the current recording rate a maximum segment rate associated with a first segment of the multimedia content.

5. The recording method according to claim 1, wherein decreasing the current recording rate and/or increasing the current recording rate consists in defining a new current rate as a function of a mean rate of writing in the mass memory and/or of a mean rate of the electronic equipment receiving the multimedia content.

6. The recording method according to claim 1, the recording method being performed to record a first multimedia content streamed as a first stream and at least one second multimedia content streamed as a second stream, the recording method including the step of defining a high priority stream and a low priority stream from among the first stream and the second stream.

7. The recording method according to claim 6, including, if the occupancy fraction is greater than the predetermined high occupancy threshold, the step of decreasing the current recording rate initially of the low priority stream.

8. The recording method according to claim 6, including, if the occupancy ratio is less than or equal to the predetermined low occupancy threshold, the step of increasing the current recording rate initially of the high priority stream.

9. The recording method according to claim 1, wherein at least one stream is an audio stream or an audio/video stream.

10. An electronic equipment comprising a mass memory and a system memory comprising a buffer memory, the electronic equipment being arranged to perform the recording method according to claim 1.

11. The electronic equipment according to claim 10, the electronic equipment being a set-top box.

12. The electronic equipment according to claim 10, the mass memory being a hard disk.

13. A system comprising a mass memory and electronic equipment including a system memory including a buffer memory, the mass memory being situated remote from the electronic equipment in a network, the system being arranged to perform the recording method according to claim 1.

14. A computer program including instructions to enable a microcontroller of a set-top box to perform the recording method according to claim 1.

15. A computer-readable recording medium storing a computer program including program code instructions for executing steps of the recording method according to claim 1.

16. A recording method for recording, in a mass memory of electronic equipment, at least one multimedia content streamed by at least one stream, the multimedia content being stored temporarily in a buffer memory of the electronic equipment prior to being recorded in the mass memory, the recording method comprising the steps of:
  initializing a current recording rate for the stream in the mass memory;
  acquiring a current portion of the multimedia content at the current recording rate, and storing it temporarily in the buffer memory;
  evaluating an occupancy fraction for the buffer memory;
  if the occupancy fraction of the buffer memory is greater than a predetermined high occupancy threshold, decreasing the current recording rate;
  if the occupancy fraction of the buffer memory is less than or equal to a predetermined low occupancy threshold, increasing the current recording rate, wherein
  the recording method is performed to record a first multimedia content streamed as a first stream and at least one second multimedia content streamed as a second stream, the recording method further comprising the step of:
  defining a high priority stream and a low priority stream from among the first stream and the second stream,
  if the occupancy fraction is greater than the predetermined high occupancy threshold, decreasing the current recording rate initially of the low priority stream, and
  if the occupancy ratio is less than or equal to the predetermined low occupancy threshold, increasing the current recording rate initially of the high priority stream.

* * * * *